United States Patent
Allison et al.

(10) Patent No.: US 10,032,019 B2
(45) Date of Patent: *Jul. 24, 2018

(54) SYSTEM, METHOD, AND COMPUTER PROGRAM PRODUCT FOR DETECTING ACCESS TO A MEMORY DEVICE

(71) Applicant: Stroz Friedberg, Inc., New York, NY (US)

(72) Inventors: Donald E. Allison, Richmond, VA (US); Kenneth A. Mendelson, Washington, DC (US)

(73) Assignee: Stroz Friedberg, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,565

(22) Filed: Nov. 17, 2015

(65) Prior Publication Data

US 2016/0070500 A1    Mar. 10, 2016

Related U.S. Application Data

(63) Continuation of application No. 11/882,105, filed on Jul. 30, 2007, now Pat. No. 9,336,387.

(51) Int. Cl.
*G06F 12/00* (2006.01)
*G06F 13/00* (2006.01)
(Continued)

(52) U.S. Cl.
CPC .......... *G06F 21/552* (2013.01); *G06F 3/0622* (2013.01); *G06F 3/0625* (2013.01);
(Continued)

(58) Field of Classification Search
CPC .... G06F 12/14; G06F 12/1433; G06F 21/552; G06F 21/78; G06F 21/79; G06F 21/80;
(Continued)

(56) References Cited

U.S. PATENT DOCUMENTS 5,297,265 A * 3/1994 Frank ................. G06F 9/30003
711/202
5,551,006 A * 8/1996 Kulkarni ............. G06F 12/0835
711/135
(Continued)

FOREIGN PATENT DOCUMENTS

JP    07074840 A    3/1995

OTHER PUBLICATIONS

Hatfield, J., "List of Public Smart Attributes," T13 Technical Committee, Seagate, Oct. 18, 2005, (retrieved Oct. 17, 2008), retrieved from: <URL: http://www.t13.org/Documents/Uploaded-Documents/docs2005/e05173r0-ACS-SMARTAttributes_List.pdf>; 3 pages.

(Continued)

*Primary Examiner* — Sheng-Jen Tsai
(74) *Attorney, Agent, or Firm* — Sterne, Kessler, Goldstein & Fox, PLLC

(57) ABSTRACT

Discrete events that take place with respect to a hard disk drive or other I/O device or port are indicated to logic that implements Self-Monitoring Analysis and Reporting Technology (SMART) or similar technology. These events are communicated to SMART as event data. Examples of such discrete events include power on, power off, spindle start, and spindle stop, positioning of the actuator, and the time at which such events occur. SMART then compiles event data to create compiled activity data. Compiled activity data represents summary statistical information that is created by considering some or all of the event data. Examples of compiled activity data include the Time Powered On and Power Cycle Count. Collection logic then writes the compiled activity data to a memory medium. An analyst can then read data from log file(s).

30 Claims, 5 Drawing Sheets

(51) Int. Cl.
*G06F 13/28* (2006.01)
*G06F 21/55* (2013.01)
*G06F 21/79* (2013.01)
*G06F 12/14* (2006.01)
*G06F 21/80* (2013.01)
*G06F 21/78* (2013.01)
*G06F 3/06* (2006.01)

(52) U.S. Cl.
CPC .......... *G06F 3/0634* (2013.01); *G06F 3/0653* (2013.01); *G06F 3/0655* (2013.01); *G06F 3/0688* (2013.01); *G06F 12/14* (2013.01); *G06F 12/1433* (2013.01); *G06F 21/78* (2013.01); *G06F 21/79* (2013.01); *G06F 21/80* (2013.01)

(58) Field of Classification Search
CPC .... G06F 3/0622; G06F 3/0625; G06F 3/0634; G06F 3/0653; G06F 3/0655; G06F 3/0688
USPC ...................................................... 711/103
See application file for complete search history.

(56) References Cited

U.S. PATENT DOCUMENTS

| | | | | |
|---|---|---|---|---|
| 5,889,952 A * | 3/1999 | Hunnicutt | ........... | G06F 21/6218 709/219 |
| 5,896,496 A * | 4/1999 | Suzuki | ............... | H04L 12/2602 370/248 |
| 6,003,121 A * | 12/1999 | Wirt | .................... | G06F 12/0684 711/105 |
| 6,216,178 B1 * | 4/2001 | Stracovsky | ......... | G06F 12/0215 710/116 |
| 6,230,223 B1 * | 5/2001 | Olarig | .................... | G06F 13/14 710/104 |
| 6,347,367 B1 * | 2/2002 | Dell | .................... | G06F 13/4239 326/30 |
| 6,587,909 B1 * | 7/2003 | Olarig | ................ | G06F 13/4081 710/302 |
| 6,600,614 B2 | 7/2003 | Lenny et al. | | |
| 6,625,732 B1 | 9/2003 | Weirauch et al. | | |
| 7,302,698 B1 | 11/2007 | Proudler et al. | | |
| 7,313,611 B1 * | 12/2007 | Jacobs | .................... | H04L 29/06 709/223 |
| 7,406,545 B1 | 7/2008 | Rothberg et al. | | |
| 9,229,747 B2 * | 1/2016 | Berke | ...................... | G11C 5/14 |
| 2002/0032640 A1 * | 3/2002 | LaFore | ................. | G06Q 40/04 705/37 |
| 2002/0144071 A1 * | 10/2002 | Williams | ........... | G06F 13/1689 711/167 |
| 2002/0162026 A1 | 10/2002 | Neuman et al. | | |
| 2002/0178382 A1 | 11/2002 | Mukai et al. | | |
| 2003/0023868 A1 * | 1/2003 | Parent | ............... | G06F 17/30595 726/18 |
| 2003/0063524 A1 * | 4/2003 | Niemiec | ............. | A61B 5/0002 368/10 |
| 2003/0145215 A1 * | 7/2003 | Dohi | .................... | G06F 21/725 713/193 |
| 2003/0165230 A1 * | 9/2003 | Reuss | ................. | H04M 3/5183 379/265.02 |
| 2004/0117581 A1 * | 6/2004 | Lee | ..................... | G06F 13/1684 711/170 |
| 2005/0005045 A1 * | 1/2005 | Kim | .................. | G06K 7/10297 710/74 |
| 2005/0015624 A1 | 1/2005 | Ginter et al. | | |
| 2005/0066178 A1 | 3/2005 | Rowe et al. | | |
| 2005/0138164 A1 | 6/2005 | Burton et al. | | |
| 2005/0138617 A1 * | 6/2005 | Friedman | .............. | G06F 9/4411 717/174 |
| 2005/0154850 A1 * | 7/2005 | Collins | ................. | G06F 9/4403 711/170 |
| 2005/0273860 A1 | 12/2005 | Chess et al. | | |
| 2006/0026432 A1 | 2/2006 | Weirauch et al. | | |
| 2006/0031476 A1 | 2/2006 | Mathes et al. | | |
| 2006/0053354 A1 * | 3/2006 | Kliewer | ............... | G11C 29/025 714/718 |
| 2006/0095569 A1 | 5/2006 | O'Sullivan | | |
| 2006/0095570 A1 | 5/2006 | O'Sullivan | | |
| 2006/0112427 A1 | 5/2006 | Shahbazi | | |
| 2006/0123190 A1 | 6/2006 | Weirauch et al. | | |
| 2006/0143670 A1 * | 6/2006 | Kosha | .................... | H04N 5/782 725/100 |
| 2006/0179325 A1 | 8/2006 | Debiez | | |
| 2006/0208092 A1 * | 9/2006 | Winkler | ............... | G11C 16/349 235/492 |
| 2006/0242356 A1 | 10/2006 | Mogi et al. | | |
| 2006/0253905 A1 | 11/2006 | Mansel | | |
| 2007/0101164 A1 | 5/2007 | Ando et al. | | |
| 2007/0157290 A1 * | 7/2007 | Crawford | ................ | G06F 21/34 726/3 |
| 2007/0266144 A1 | 11/2007 | Bollen et al. | | |
| 2007/0299631 A1 | 12/2007 | Macbeth et al. | | |
| 2008/0022018 A1 | 1/2008 | Konno et al. | | |
| 2008/0092237 A1 | 4/2008 | Yoon et al. | | |
| 2008/0144531 A1 | 6/2008 | Fisher et al. | | |
| 2008/0184110 A1 | 7/2008 | Barsness et al. | | |
| 2008/0250190 A1 * | 10/2008 | Johnson | ................ | G06F 3/0481 711/103 |
| 2009/0037654 A1 * | 2/2009 | Allison | .................. | G06F 21/552 711/112 |
| 2009/0150721 A1 * | 6/2009 | Kochar | ............... | G06F 11/1008 714/6.11 |
| 2010/0058008 A1 * | 3/2010 | Sakada | ............... | G06F 11/1479 711/156 |
| 2013/0121093 A1 * | 5/2013 | Morimoto | ............... | G06F 13/00 365/189.15 |
| 2015/0254192 A1 * | 9/2015 | Linstadt | .................... | G11C 7/10 711/103 |

OTHER PUBLICATIONS

International Search Report with Written Opinion of the International Searching Authority issued in Int'l Patent Application No. PCT/US08/09128, prepared Oct. 17, 2008 and dated Oct. 30, 2008, 9 pages.

Allen, B., "Monitoring Hard Disks with Smart." Linux Journal 117 (2004): 74-77.

Lonvick, C., "RFC 3164: The BSD Syslog Protocol." Network Working Group, (May 9, 2001); 23 pages.

"Out Smart Your Hard Drive" (Retrieved May 19, 2010), retrieved from: <URL: http://www.prefetch.net/articles/diskdrives.smart.hmtl>; 5 pages.

* cited by examiner

SYSTEM, METHOD, AND COMPUTER PROGRAM PRODUCT FOR DETECTING ACCESS TO A MEMORY DEVICE

CROSS REFERENCE TO RELATED APPLICATIONS

This patent application is a continuation of U.S. patent application Ser. No. 11/882,105, filed Jul. 30, 2007, which is incorporated herein by reference in its entirety.

BACKGROUND OF THE INVENTION

Field of the Invention

The invention described herein relates to information security and in particular relates to detecting access to memory media.

Background Art

Hard disk drives are found in most modern computers. Such devices are capable of storing enormous amounts of data including, inter alia, sensitive, proprietary, confidential or otherwise non-public information. Loss of hard disks or computers containing these devices can occur as a result of theft or negligence. Such loss can expose the hard drive data to unauthorized people or processes. This risk is particularly significant with respect to laptop, notebook, tablet and other forms of portable computers.

In the event that a lost or stolen computer containing a hard drive is subsequently recovered, it may be desirable to know whether the hard drive had been accessed while it was out of the owner's control. Such access may be indicative of a security breach. This information would be particularly relevant in highly sensitive contexts (e.g. government intelligence work or corporate intellectual property development).

Access may be detected if the hard drive was accessed by the computer in which it was installed (i.e., the host computer). Boot processes of current hard drives change file system metadata and record a variety of additional data, such as the date and time of the last shut down. Such events (e.g., start up, boot processing, and shut down) are detectable using widely available digital forensic tools and techniques. Currently, however, there is no forensic method available to detect whether or not a hard drive has been accessed using a read-only connection to the hard drive. Such access would leave no indication on the hard drive that it had been accessed after the last shut down is recorded.

There is a need, therefore, for a system and method that allow analysis to be performed on the activity of a hard disk drive in order to assess whether the hard disk has been accessed through a read-only connection.

BRIEF DESCRIPTION OF THE DRAWINGS/FIGURES

Figure 1:
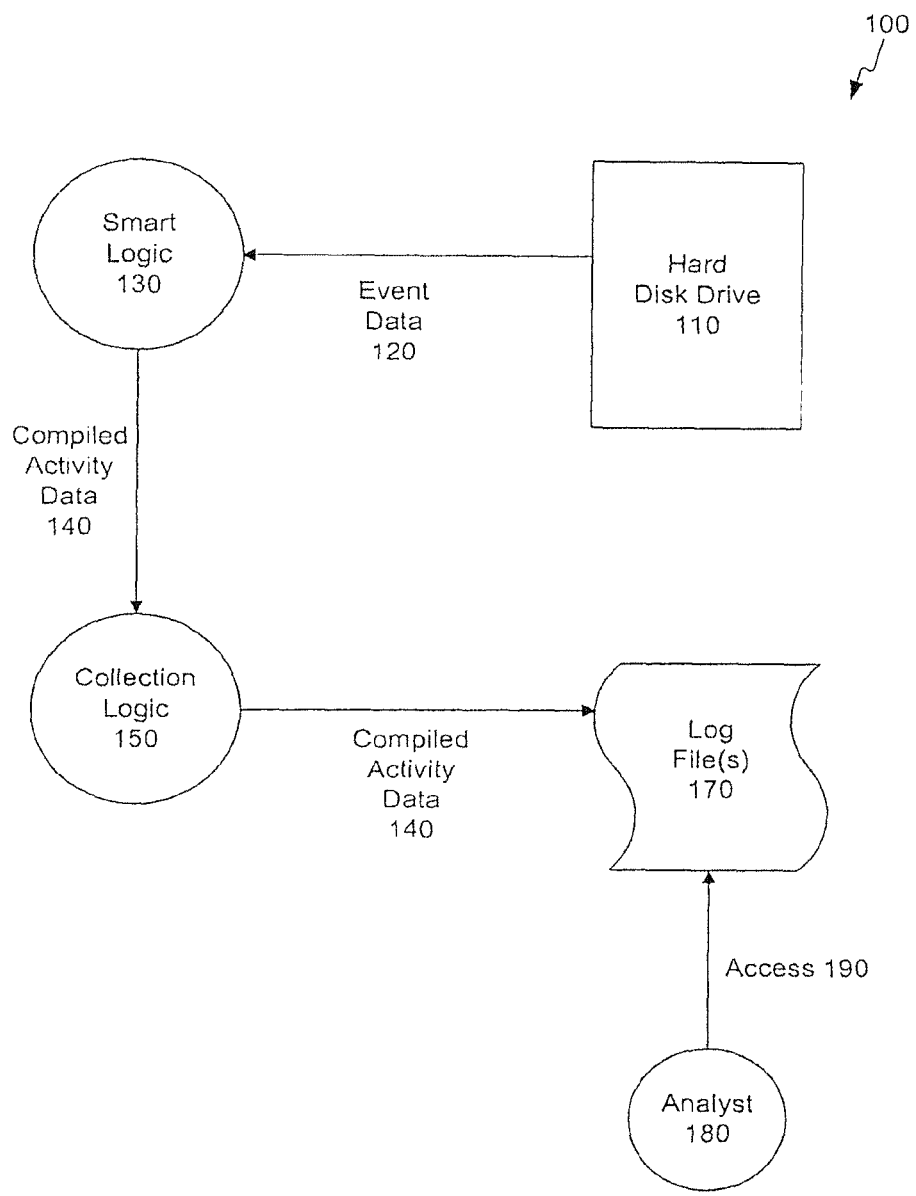
FIG. 1 is a data flow diagram illustrating the logical components and overall operation of an embodiment of the invention.

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The invention described herein can be used to determine whether a hard drive or other I/O device or port has been accessed through a read-only connection after the last recorded shut-down of the host computer in which the hard drive was last installed. In the case of an external hard drive, the invention can be used to determine whether the external hard drive has been accessed since its last known shut down.

An embodiment of the invention takes advantage of technology that detects events at a hard disk drive and compiles this information into activity information. One example of such a technology is a suite of drive diagnostic programs, or tools, called Self-Monitoring Analysis and Reporting Technology (SMART). This suite has been incorporated into the firmware of almost every hard drive manufactured since the late 1990s. Hard drive manufacturers incorporated this logic into their drives to act as an early warning system for impending drive problems. On a drive with SMART installed, the hard drive's integrated controller works with various sensors to monitor different aspects of the drive's performance, and uses this information to determine whether or not the drive is behaving normally. Both operating system developers and basic input output system (BIOS) developers include software that reads and interacts with the SMART data.

SMART includes a variety of diagnostic programs. Two of the diagnostic tools incorporated into SMART generate the Time Powered On and Power Cycle Count statistics, respectively. Similar to an odometer on an automobile, the Time Powered On is a running total of time that the hard drive has been powered on since origination of the drive. The Power Cycle Count represents a record of the number of times a hard drive has been powered on and off. The hard drive itself uses the SMART data to monitor the 'health' of the hard drive and makes the information available to the host upon request. For any actions beyond self-monitoring, it is up the host to request and analyze the data, and typically up to the user to take appropriate action. A program such as Symantec Corporation's Norton Utilities, for example, may initiate a SMART request, utilize the SMART data, and then notify the user of any potential problems.

An embodiment of the invention exploits SMART outputs, such as the Time Powered On and Power Cycle Count data, to provide both software and hardware manufacturers with the ability to produce tamper-evident products. Additional data generated by SMART may also be exploited to aid in determining evidence of tampering. Examples include the Power-Off Retract Count, which shows a count of the number of times the drive was powered down; the Start/Stop Count, which is a count of hard disk spindle start/stop cycles; and the Loaded Hours, which shows loading on a magnetic head's actuator caused by the general operating time counted while the actuator is in the operating position. Since the SMART specifications allow for manufacturer-specific attributes to be developed and stored, potentially many other factors may be brought to bear in determining evidence of tampering.

Note that in the illustrations and in the following text, an embodiment of the invention is described in which SMART is used to track and compile event information from a hard disk drive. Such an embodiment is exemplary in nature. In alternative embodiments, any technology that is functionally similar to SMART may be used. Moreover, the invention is not limited to analysis of hard drive activity. Other memory devices and other I/O devices or ports may alternatively be analyzed by embodiments of the invention.

Operation of an embodiment of the invention is illustrated generally in FIG. 1. Hard disk drive 110 is under analysis in this illustration. Discrete events that take place with respect to hard disk drive 110 are indicated to logic 130 that implements SMART. These events are communicated to SMART logic 130 as event data 120. Examples of such discrete events include power on, power off, spindle start, and spindle stop, positioning of the actuator, and the time at which such events occur. As mentioned above, SMART logic 130 can be implemented in firmware and executed by an integrated controller for the hard disk drive 110.

SMART logic 130 then compiles event data 120 to create more usable information that is shown as compiled activity data 140. Compiled activity data 140 represents summary statistical information that is created by considering some or all of event data 120. Examples of compiled activity data 140 include the Time Powered On and Power Cycle Count. Both are derived from event data 120, which includes the time(s) at which the hard disk drive 110 is powered on and powered off, for example. Other examples of compiled activity data 140 can include the Power-Off Retract Count, the Start/Stop Count, and the Loaded Hours, all discussed above.

Compiled activity data 140 is made available to and read by collection logic 150. In an embodiment of the invention, collection logic 150 would, for example, read the Time Powered On and the Power Cycle Count from SMART logic 130. Collection logic 150 can be implemented as part of the microcode of hard disk drive 110. Alternatively, collection logic 150 can be implemented in complementary metallic oxide semiconductor (CMOS) in system code such as the BIOS or the extensible firmware interface (EFI).

Collection logic 150 then writes the compiled activity data 140 to a memory medium. The memory medium can be a reserved area of system memory, for example. In an alternative embodiment of the invention, the memory medium can be a location on hard disk drive 110 itself. In this latter case, the compiled activity data 140 could be stored, for example, in a reserved location of hard disk drive 110 and/or protected using a protective coding scheme such as encryption. In an embodiment of the invention, the compiled activity data could be logged in more than one of these locations, e.g., in both system memory and in a reserved hard drive location, for purposes of operational redundancy or security.

In an embodiment of the invention, the compiled activity data 140 is written to one or more log files 170 in the memory medium. An analyst 180 could then read data 140 from log file(s) 170 by performing access 190.

Note that analyst 180 is a human analyst in an embodiment of the invention. In an alternative embodiment, analyst 180 could be a computer program running on a programmable processor. One example of such as a program would be an inference engine coded a programming language. Such an embodiment could use, for example, an artificial intelligence language to embody the inference engine. Alternatively, assessment may be performed cooperatively by both a human analyst and an automated process.

Figure 2:
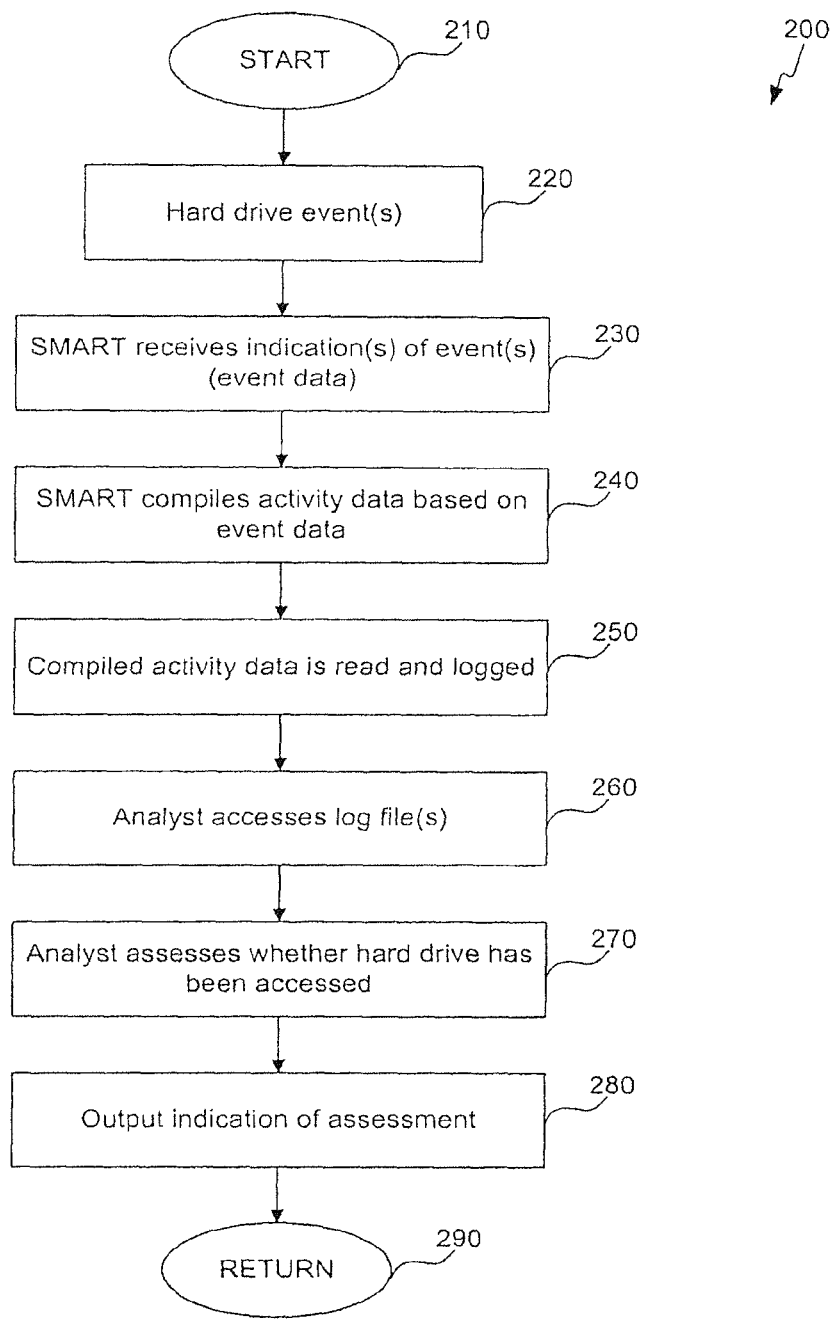
FIG. 2 is a flow chart illustrating the processing of an embodiment of the invention.

Processing of the invention is illustrated in greater detail in FIG. 2. The process begins at step 210. In step 220, one or more events take place at the hard drive. As discussed above, these events can include power on, power off, spindle start, spindle stop, and the positioning of the disk drive's actuator. These events are indicated to (or read by) logic that implements SMART. The indication of these events is referred to herein as event data. The event data is received by the SMART logic in step 230.

In step 240, the SMART logic compiles the event data into summary level information, referred to herein as activity data. Examples of activity data include the Time Powered On and the Power Cycle Count, as well as the Power-Off Retract Count, the Start/Stop Count, and the Loaded Hours. In step 250, the activity data is read and logged by the collection logic. The collection logic 150, illustrated in FIG. 1, can be incorporated into hard drive microcode, system code such as CMOS/BIOS/EFI, or operating system code. As discussed above, the activity data can be logged into one or more log files. The log file(s) can be located in a hidden hard drive partition or a partition available only to the manufacturer, in the system BIOS, or in a file viewable from within the operating system, for example. The log file(s) can be located on a different hard disk in an alternative embodiment of the invention.

In step 260, an analyst can access the log file(s). In step 270, the analyst uses the activity data written therein to assess whether the hard disk drive has been accessed in read-only mode since the last recorded shut down. In an embodiment of the invention, the analyst is human; alternatively, the analyst can be an automated process. Alternatively, assessment may be performed cooperatively by both a human analyst and an automated process. In step 280, the analyst produces and outputs an indication of the assessment, e.g., whether the hard disk drive was accessed, and/or the likelihood thereof. The process concludes at step 290.

Moreover, in an embodiment of the invention, collection logic 150 would poll device clocks in addition to the SMART output (i.e., activity data) at startup and at shutdown, to read and log both the activity data and device date/times. It can be helpful to the analyst to know the system(s) or device(s) to which the hard disk drive was connected, and when the connection(s) were active. This allows the analyst to know the system context in which the hard disk drive was operating, e.g., whether the drive was accessed by an authorized or an unauthorized host. The determination of what system(s) or device(s) were connected to the hard disk drive can be made using a polling process in an embodiment of the invention. As discussed above, this data can be logged in one or more locations (e.g. in a hidden hard drive partition or partition available only to the manufacturer, in the system BIOS, or in a file viewable from within the operating system).

Figure 3:
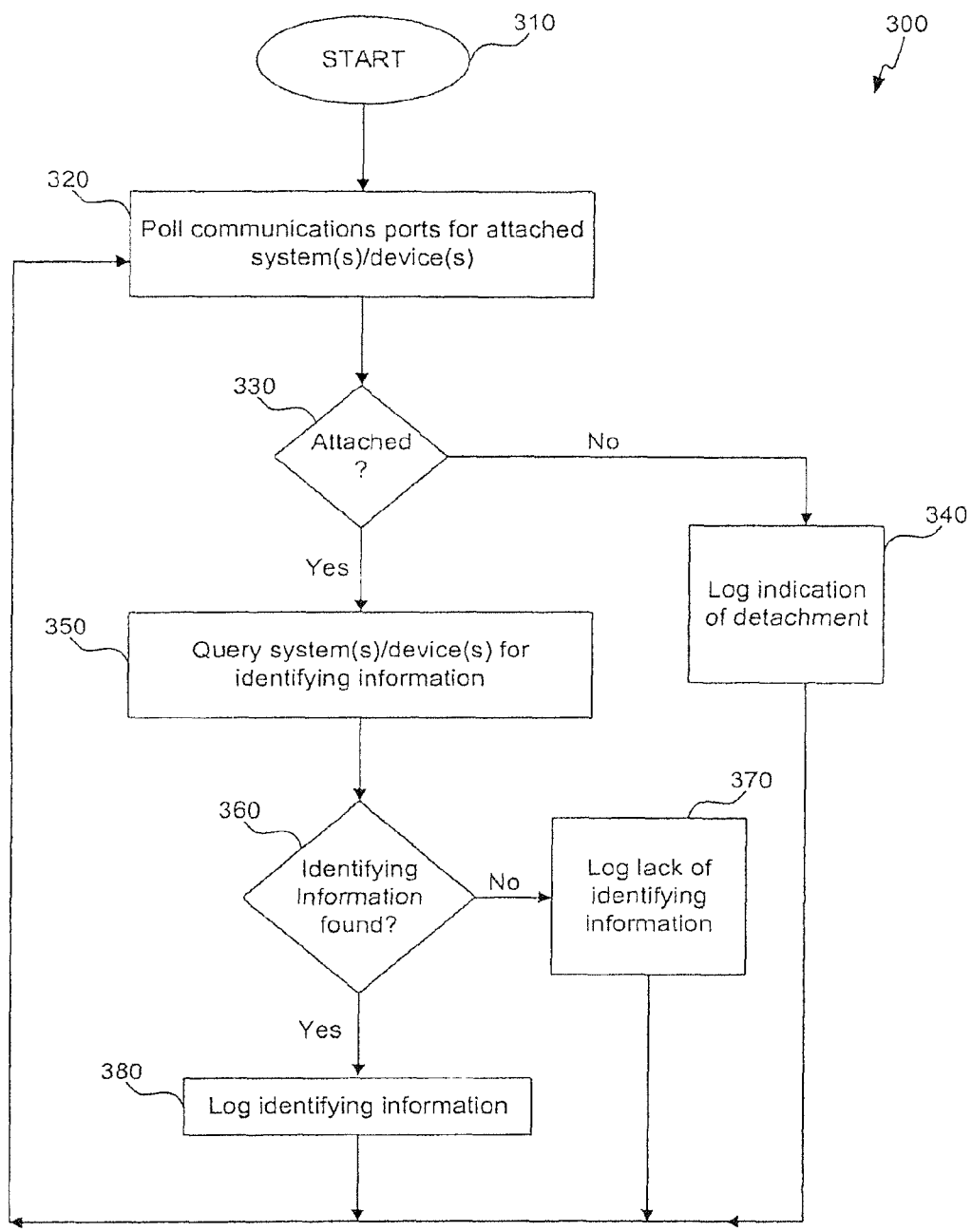
FIG. 3 is a flow chart illustrating the process of polling communications port(s) of a memory device, according to an embodiment of the invention.

An embodiment of such a polling process is illustrated in FIG. 3. The process 300 begins at step 310. At step 320, the communications ports of the hard disk drive are polled to determine if there are any attached systems or devices. If, in step 330, it is determined that the hard drive is not attached to any system or device, then this fact is logged in a log file in step 340, and the polling continues at step 320. If the hard disk drive is attached to a system or device, then processing continues at step 350.

In step 350, any attached systems or devices are queried for identifying information. In step 360, a determination is made as to whether identifying information was found. If not, then the absence of identifying information is written to the log file in step 370, and the polling continues at step 320. If identifying information is found, then this information is written to the log file in step 380, and the polling continues at step 320.

In an embodiment of the invention, collection logic that interacts with SMART from the CMOS/BIOS/EFI will perform the polling and storage of the same values of, say, the Time Powered On and the Power Cycle Count in either a reserved area of the system/device memory or on the hard drive itself using a protective coding scheme such as encryption and/or reserved locations on the drive. The same would be true for the collection logic interacting with SMART from an operating system installed on the system/device.

Since the log files will contain activity data and connectivity information, the files can then be checked by an analyst for anomalies. For example, if a laptop is stolen and recovered, the analyst can look at the logs to see if, when, and for how long the hard drive was accessed. Further, time gaps or inconsistencies in the log could indicate that a drive was removed and accessed in read-only mode, or through the use of external hardware and software.

In one example, according to an embodiment of the invention, if the log file shows a one hour gap between the last recorded powered down time and the next recorded powered on time, an analyst will be alerted that the drive was turned on for an hour while the operating system was not running. The analyst could then review the BIOS and hard drive-level logs to determine the time the drive was accessed, yielding a start in discovering an otherwise potentially undetectable culprit. Because the invention can be implemented at the hard drive, hardware interface, and operating system levels, tampering with any one log helps alert an analyst to potential data theft.

In an alternative embodiment of the invention, the relevant event data 120 is compiled each time the hard disk 110 stops, and the compiled activity data is stored on the hard drive and on the host computer. An identifier is also created on the basis of the compiled activity data, and stored with the compiled activity data at both locations. The identifiers can be compared at a later time, such as boot-up. A mismatch of identifiers would imply that the hard disk may have been accessed since the hard disk drive was last known to have stopped.

Figure 4:
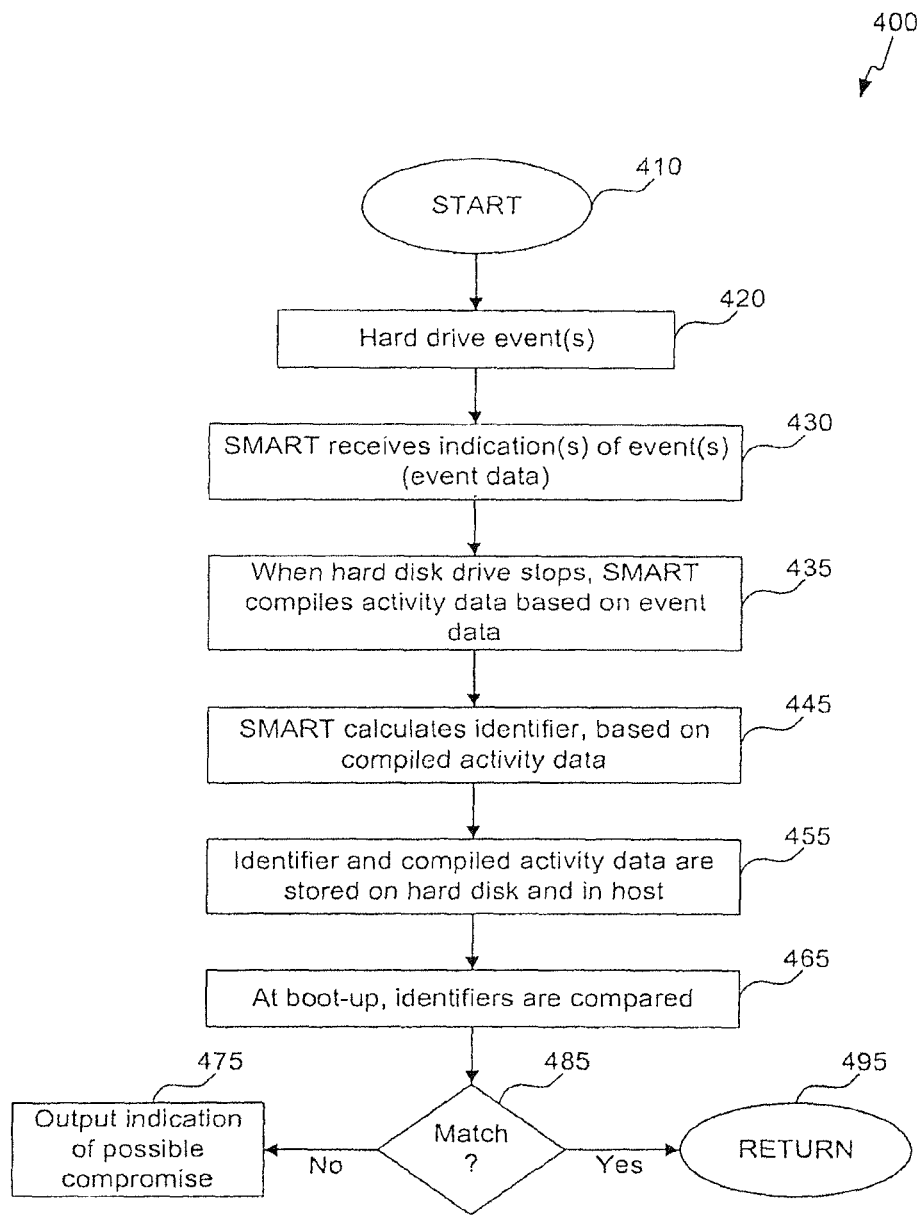
FIG. 4 is a flow chart illustrating the process of an embodiment of the invention wherein an identifier is created and used in determining whether a hard disk may have been compromised.

An embodiment of this process is illustrated in FIG. 4. The process begins at step 410. After hard drive events take place in step 420, the SMART logic receives one or more indications of these events (event data) in step 430. In step 435, the SMART logic compiles the activity data when the hard disk drive stops. A unique identifier is then calculated for the compiled activity data in step 445. The identifier can be a function of the compiled activity data. Examples of such an identifier include, but are not limited to, a hash function or cyclic redundancy code (CRC). The identifier can alternatively be the output of a secure cryptographic operation, so that the identifier could not be readily created by an adversary. In step 455, both the compiled data and the identifier are stored on both the hard disk drive and a memory device in the host computer (other than the hard disk) when the computer is shut down.

At each boot event the identifiers are compared (step 465). If they are found not to match in step 485, this is an indication that the hard disk drive has been removed and accessed. The identifiers would not match, for example, if the hard disk drive was turned on outside of the host computer, resulting in a situation where the SMART data identifier that was created while the hard disk drive was outside the host computer does not match the identifier last stored on the host. In step 475, an indication of possible compromise is output if the identifiers fail to match.

Embodiments of the invention can work with software, hardware, and/or operating system implementations other than those described herein. Any software, hardware, and operating system implementations suitable for performing the functions described herein can be used.

Figure 5:
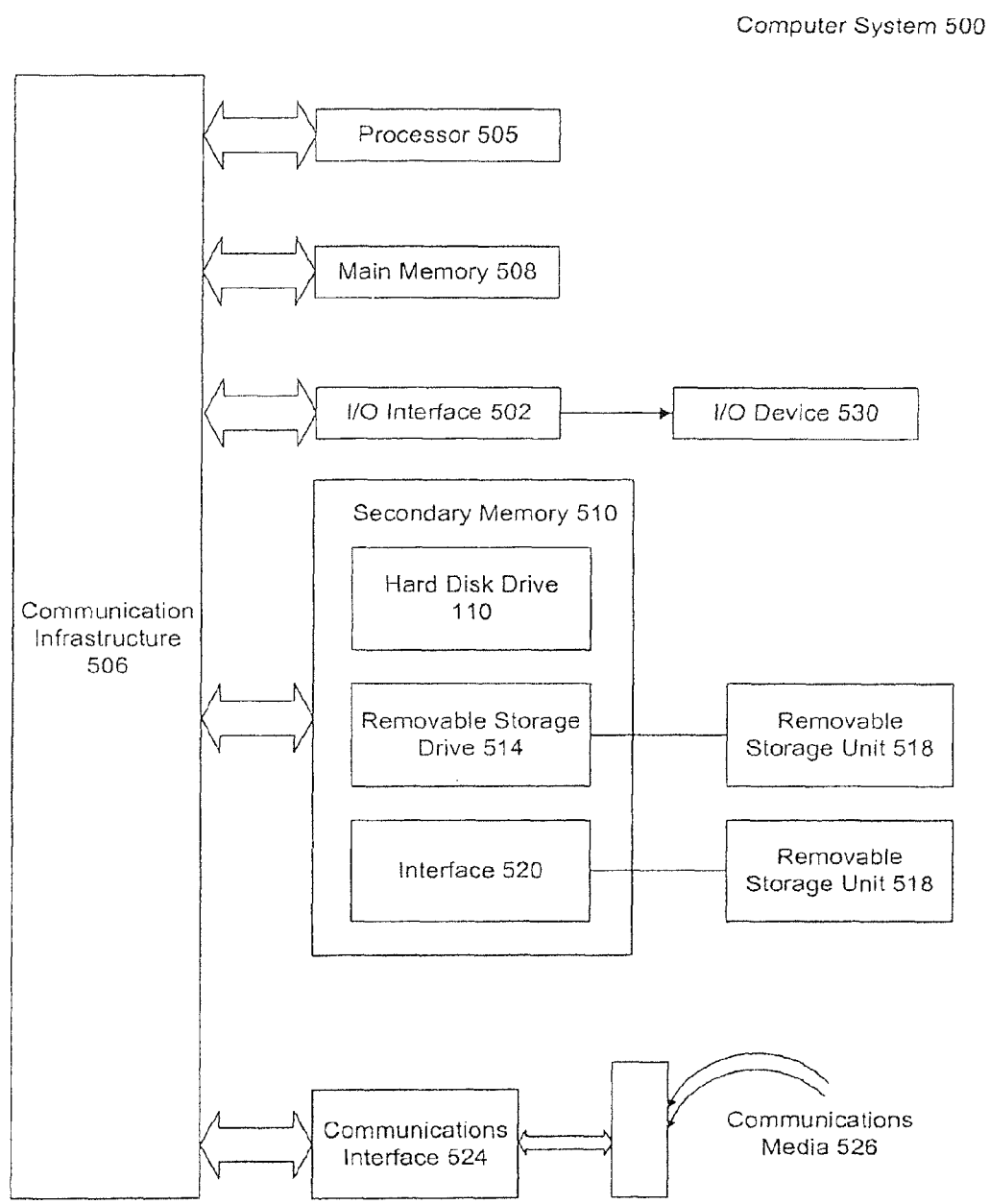
FIG. 5 is a block diagram illustrating the computing environment of the invention.

In an embodiment of the present invention, the system and components of the present invention described herein are implemented with respect to a hard disk drive normally used in a computer, such as computer 500 shown in FIG. 5. The computer 500 can be any commercially available and well known computer capable of performing the functions described herein, such as a computer available from International Business Machines, Apple, Silicon Graphics Inc., Sun, HP, Dell, Compaq, Digital, Cray, etc., or may alternatively be a custom designed machine.

The computer 500 includes one or more processors (also called central processing units, or CPUs), such as a processor 504. The processor 504 is connected to a communication bus 506. The computer 500 also includes a main or primary memory 508, such as random access memory (RAM). The primary memory 508 has stored therein control logic (computer software), and data.

The computer 500 also includes one or more secondary storage devices 510. The secondary storage devices 510 include, for example, the hard disk drive 110 and/or a removable storage device or drive 514. As discussed above, SMART logic 130 can be implemented in the firmware of hard disk drive 110. The removable storage drive 514 represents one or more of a floppy disk drive, a magnetic tape drive, a compact disk drive, an optical storage device, tape backup, etc. for interaction with a corresponding removable storage unit 518. An interface 520 may also be provided for connection to another removable storage unit 518.

A removable storage unit 518 includes a computer useable or readable storage medium having stored therein computer software (control logic) and/or data. Removable storage unit 518 represents a floppy disk, magnetic tape, compact disk, DVD, optical storage disk, or any other removable computer data storage device. The removable storage drive 514 reads from and/or writes to the removable storage unit 518 in a well known manner.

The computer 500 may also include input/output/display device 530, such as a monitor, keyboard, pointing device, etc., connected to communications infrastructure 506 via I/O interface 502.

The computer 500 may further include a communication or network interface 524. The network interface 524 enables the computer 500 to communicate with remote devices. For example, the network interface 524 allows the computer 500 to communicate over communication networks or media 526 (representing a form of a computer useable or readable medium), such as LANs, WANs, the Internet, etc. The network interface 524 may interface with remote sites or networks via wired or wireless connections.

Control logic may be transmitted to and from the computer 500 via the communication medium 526. More particularly, the computer 500 may receive and transmit carrier waves (electromagnetic signals) modulated with control logic via the communication medium 526.

Any apparatus or manufacture comprising a computer useable or readable medium having control logic (software) stored therein is referred to herein as a computer program product or program storage device. This includes, but is not limited to, the computer 500, the main memory 508, the hard disk 110, and the removable storage unit 518. Carrier waves can also be modulated with control logic and received via communication medium 526. Such computer program products and carrier waves, having control logic stored therein that, when executed by one or more data processing devices, cause such data processing devices to operate as described herein, represent embodiments of the invention.

The collection logic 150 can be implemented in the microcode of hard disk drive 110 in an embodiment of the invention. Alternatively, collection logic 150 can be implemented in operating system code executed from main memory 508, or in system code implemented in CMOS/BIOS/EFI (not shown in FIG. 5), as discussed above.

Log file(s) 170 may be implemented as a file viewable from within the operating system, in a partition of hard disk drive 110, or in system BIOS.

Note that the embodiments described above take advantage of SMART as this technology as currently configured. Alternative embodiments can analogously use future versions and variations of SMART, or any similar technology. The invention can be implemented using any logic that captures event data from a hard disk drive and compiles the event data into activity data.

Nor is the invention limited to capturing and analyzing activity of the hard drive only. Alternative embodiments of the invention can capture and analyze activity at other memory devices and I/O devices and ports. Forensic analysis of a computer system might benefit from knowing when a flash drive was accessed, for example, or when a communications port was active and for how long. Such activity could be tracked and logged by an embodiment of the invention.

While some embodiments of the present invention have been described above, it should be understood that they have been presented by way of example only and are not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present invention as contemplated by the inventor, and thus are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method within a memory device for creating a data set relating to an operational status and a connection status of the memory device, the data set capable of being analyzed, the method comprising:

collecting compiled historical activity data and connection state data regarding activity of the memory device,
wherein the connection state data includes data regarding a connection status of an authorized second device and an unauthorized third device connected to the memory device, a time when a connection with the authorized second device was active, a time when a connection with the unauthorized third device was active, and an identification of the authorized second device,
wherein an identification of the unauthorized third device is unavailable, and the unauthorized third device is unauthorized to access contents of the memory device,
wherein the connection state data further includes an indication of a lack of identifying information of the unauthorized third device, and
wherein the time when the connection with the unauthorized third device was active is a time when the unauthorized third device had access to the contents of the memory device;
calculating an identifier as a function of the compiled historical activity data and connection state data;
writing the compiled historical activity data, the connection state data, and the identifier to a location within the memory device,
wherein the calculating the identifier is performed before the writing the compiled historical activity data, the connection state data, and the identifier to a location within the memory device, and after the collecting the compiled historical activity data and the connection state data;
writing the compiled historical activity data, the connection state data, and the identifier to a host memory medium other than the memory device; and
comparing the identifier stored on the memory device with the identifier stored in the host memory medium to detect a possible compromise of the memory device.

2. The method of claim 1, further comprising:
reading at least a portion of the compiled historical activity data and connection state data from the memory device;

analyzing the compiled historical activity data and connection state data to identify anomalous events; and
outputting a result of the analysis.

3. The method of claim 2, wherein the analyzing the compiled historical activity data and connection state data is performed at least in part by a human analyst.

4. The method of claim 2, wherein the analyzing the compiled historical activity data and connection state data is performed at least in part by an automated inference engine.

5. The method of claim 2, further comprising:
receiving indications of discrete events taking place in the memory device; and
compiling the indications to create the compiled historical activity data and connection state data regarding the activity of the memory device.

6. The method of claim 1, wherein the memory device comprises one or more log files.

7. The method of claim 1, wherein the compiled historical activity data comprises an indication of a start/stop count for the memory device.

8. The method of claim 1, wherein the compiled historical activity data comprises an indication of loaded hours of the memory device.

9. The method of claim 1, wherein the collecting compiled historical activity data and connection state data is performed at a startup and at a shutdown of the memory device.

10. The method of claim 1, wherein the collecting compiled historical activity data and connection state data is performed by logic stored in memory device microcode.

11. The method of claim 10, wherein the memory device microcode resides in one or more of:
complementary metallic oxide semiconductor (CMOS) storage;
a basic input output system (BIOS); and
an extensible firmware interface (EFI).

12. The method of claim 1, further comprising:
polling a communications port of the memory device to determine if the memory device is connected to another device or system;
writing an indication of detachment to the memory device when the memory device is disconnected from the another device or system;
querying the another device or system for identifying information when the memory device is connected to the another device or system;
writing the indication of a lack of identifying information to the memory device when the identifying information is unavailable; and
writing the identifying information to the memory device when the identifying information is obtainable.

13. A system for creating a data set relating to an operational status and a connection status of a memory device, the data set capable of being analyzed, comprising:
a processor; and
a first storage medium in communication with said processor, said first storage medium for storing a plurality of processing instructions for directing said processor to:
collect compiled historical activity data and connection state data regarding activity of the memory device,
wherein the connection state data includes data regarding a connection status of an authorized second device and an unauthorized third device connected to the memory device, a time when a connection with the authorized second device was active, a time when a connection with the unauthorized third device was active, and an identification of the authorized second device, and
wherein an identification of the unauthorized third device is unavailable, and the unauthorized third device is unauthorized to access contents of the memory device,
wherein the connection state data further includes an indication of a lack of identifying information of the unauthorized third device, and
wherein the time when the connection with the unauthorized third device was active is a time when the unauthorized third device had access to the contents of the memory device;
calculate an identifier as a function of the compiled historical activity data and connection state data;
write the compiled historical activity data, the connection state data, and the identifier to a second storage medium within the memory device,
wherein the identifier is calculated before the compiled historical activity data, the connection state data, and the identifier are written to a location within the memory device, and after the compiled historical activity data and the connection state data are collected;
write the compiled historical activity data, the connection state data, and the identifier to a host memory medium other than the memory device; and
compare the identifier stored on the memory device with the identifier stored in the host memory medium to detect a possible compromise of the memory device.

14. The system of claim 13, wherein the plurality of processing instructions are for further directing the processor to analyze at least a portion of the compiled historical activity data and connection state data.

15. The system of claim 13, wherein said second storage medium comprises one or more log files.

16. The system of claim 13, wherein said compiled historical activity data comprises an indication of a start/stop count for the memory device.

17. The system of claim 13, wherein said compiled historical activity data comprises an indication of loaded hours of the memory device.

18. The system of claim 13, wherein said processing instructions are for further directing said processor to collect compiled historical activity data and connection state data at a startup and a shutdown of the memory device.

19. The system of claim 13, wherein said processing instructions are stored in memory device microcode.

20. The system of claim 19, wherein the memory device microcode is stored in one or more of:
CMOS;
BIOS; and
an extensible firmware interface.

21. The system of claim 13, wherein said plurality of processing instructions further directs said processor to:
poll a communications port of the memory device to determine if the memory device is connected to another device or another system;
write an indication of the attachment to the second storage medium when the memory device is disconnected from the another device or system;
query the another device or system for identifying information when the memory device is connected to the another device or system;

write an indication of a lack of identifying information to the second storage medium when the identifying information is unavailable; and
write the identifying information to the second storage medium when the identifying information is obtainable.

22. The method of claim 1, further comprising:
identifying changes to the compiled historical activity data and connection state data; and
verifying the integrity of the compiled historical activity data and connection state data stored based on the identified changes.

23. A method within a hard disk for creating a data set relating to an operational status and a connection status of the hard disk, the data set capable of being analyzed, the method comprising:
collecting compiled historical activity data and connection state data regarding activity of the hard disk,
wherein the connection state data includes data regarding a connection status of an authorized device and an unauthorized device connected to the hard disk, a time when a connection with the authorized device was active, a time when a connection with the unauthorized device was active, and an identification of the authorized device,
wherein an identification of the unauthorized device is unavailable, and the unauthorized device is unauthorized to access contents of the hard disk,
wherein the connection state data further includes an indication of a lack of identifying information of the unauthorized device and
wherein the time when the connection with the unauthorized device was active is a time when the unauthorized device had access to the contents of the hard disk;
calculating an identifier as a function of the compiled historical activity data and connection state data;
writing the compiled historical activity data, the connection state data, and the identifier to a location within the hard disk,
wherein the calculating the identifier is performed before the writing the compiled historical activity data, the connection state data, and the identifier to a location within the hard disk, and after the collecting the compiled historical activity data and the connection state data;
writing the compiled historical activity data, the connection state data, and the identifier to a host memory medium other than the hard disk; and
comparing the identifier stored on the hard disk with the identifier stored in the host memory medium to detect a possible compromise of the hard disk.

24. A system for creating a data set relating to an operational status and a connection status of a hard disk, the data set capable of being analyzed, comprising:
a processor; and
a first storage medium in communication with said processor, said first storage medium for storing a plurality of processing instructions for directing said processor to:
collect compiled historical activity data and connection state data regarding activity of the hard disk,
wherein the connection state data includes data regarding a connection status of an authorized device and an unauthorized third device connected to the hard disk, a time when a connection with the authorized device was active, a time when a connection with the unauthorized device was active, and an identification of the authorized device
wherein an identification of the unauthorized device is unavailable, and the unauthorized device is unauthorized to access contents of the hard disk,
wherein the connection state data further includes an indication of a lack of identifying information of the unauthorized device, and
wherein the time when the connection with the unauthorized device was active is a time when the unauthorized device had access to the contents of the hard disk;
calculate an identifier as a function of the compiled historical activity data and connection state data;
write the compiled historical activity data, the connection state data, and the identifier to a second storage medium within the hard disk,
wherein the identifier is calculated before the compiled historical activity data, the connection state data, and the identifier are written to a location within the hard disk, and after the compiled historical activity data and the connection state data are collected;
write the compiled historical activity data, the connection state data, and the identifier to a host memory medium other than the hard disk; and
compare the identifier stored on the hard disk with the identifier stored in the host memory medium to detect a possible compromise of the hard disk.

25. The method of claim 1, wherein the unauthorized third device is connected to the memory device for a first time after a last recorded shut down of the memory device and before a next recorded powered on time of the memory device.

26. The system of claim 13, wherein the unauthorized third device is connected to the memory device for a first time after a last recorded shut down of the memory device and before a next recorded powered on time of the memory device.

27. The method of claim 23, wherein the unauthorized device is connected to the hard disk for a first time after a last recorded shut down of the hard disk and before a next recorded powered on time of the hard disk.

28. The system of claim 24, wherein the unauthorized device is connected to the hard disk for a first time after a last recorded shut down of the hard disk and before a next recorded powered on time of the hard disk.

29. The method of claim 1, wherein the memory device includes a hard disk.

30. The system of claim 13, wherein the memory device includes a hard disk.

* * * * *